United States Patent
Majee

(10) Patent No.: US 11,044,200 B1
(45) Date of Patent: Jun. 22, 2021

(54) METHODS FOR SERVICE STITCHING USING A PACKET HEADER AND DEVICES THEREOF

(71) Applicant: F5 Networks, Inc., Seattle, WA (US)

(72) Inventor: Sumandra Majee, San Jose, CA (US)

(73) Assignee: F5 NETWORKS, INC., Seattle, WA (US)

( * ) Notice: Subject to any disclaimer, the term of this patent is extended or adjusted under 35 U.S.C. 154(b) by 0 days.

(21) Appl. No.: 16/505,094

(22) Filed: Jul. 8, 2019

Related U.S. Application Data

(60) Provisional application No. 62/694,636, filed on Jul. 6, 2018.

(51) Int. Cl.
*H04L 12/28* (2006.01)
*H04L 12/851* (2013.01)
*H04L 29/06* (2006.01)

(52) U.S. Cl.
CPC ...... *H04L 47/2408* (2013.01); *H04L 47/2441* (2013.01); *H04L 69/22* (2013.01)

(58) Field of Classification Search
CPC ....................................................... H04L 12/28
USPC ....................................................... 370/329
See application file for complete search history.

(56) References Cited

U.S. PATENT DOCUMENTS

| | | | |
|---|---|---|---|
| 3,950,735 A | 4/1976 | Patel | |
| 4,644,532 A | 2/1987 | George et al. | |
| 4,897,781 A | 1/1990 | Chang et al. | |
| 4,965,772 A | 10/1990 | Daniel et al. | |
| 5,023,826 A | 6/1991 | Patel | |
| 5,053,953 A | 10/1991 | Patel | |
| 5,299,312 A | 3/1994 | Rocco, Jr. | |
| 5,327,529 A | 7/1994 | Fults et al. | |
| 5,367,635 A | 11/1994 | Bauer et al. | |
| 5,371,852 A | 12/1994 | Attanasio et al. | |
| 5,406,502 A | 4/1995 | Haramaty et al. | |
| 5,475,857 A | 12/1995 | Daily | |
| 5,517,617 A | 5/1996 | Sathaye et al. | |
| 5,519,694 A | 5/1996 | Brewer et al. | |

(Continued)

FOREIGN PATENT DOCUMENTS

| | | |
|---|---|---|
| EP | 0744850 A2 | 11/1996 |
| WO | 1991/014326 A2 | 9/1991 |

(Continued)

OTHER PUBLICATIONS

"BIG-IP® Local Traffic Manager™: Monitors Reference", Nov. 13, 2017, pp. 1-134, version 13.1, F5 Networks, Inc.

(Continued)

*Primary Examiner* — Dang T Ton
(74) *Attorney, Agent, or Firm* — Troutman Pepper Hamilton Sanders LLP (Rochester)

(57) ABSTRACT

Methods, non-transitory computer readable media, network traffic manager apparatuses, and systems that assist with service stitching using a packet header includes identifying a type of service (TOS) or differentiated services code point (DSCP) value in a header field in each of a plurality of received network packets. One or more value added service chains are identified based on the identified TOS or DSCP value. The plurality of network packets are forwarded to a destination after processing each of the plurality of network packets through the identified one or more value added service chains.

20 Claims, 4 Drawing Sheets

(56) References Cited

U.S. PATENT DOCUMENTS

| | | |
|---|---|---|
| 5,519,778 A | 5/1996 | Leighton et al. |
| 5,521,591 A | 5/1996 | Arora et al. |
| 5,528,701 A | 6/1996 | Aref |
| 5,581,764 A | 12/1996 | Fitzgerald et al. |
| 5,596,742 A | 1/1997 | Agarwal et al. |
| 5,606,665 A | 2/1997 | Yang et al. |
| 5,611,049 A | 3/1997 | Pitts |
| 5,663,018 A | 9/1997 | Cummings et al. |
| 5,752,023 A | 5/1998 | Choucri et al. |
| 5,761,484 A | 6/1998 | Agarwal et al. |
| 5,768,423 A | 6/1998 | Aref et al. |
| 5,774,660 A | 6/1998 | Brendel et al. |
| 5,790,554 A | 8/1998 | Pitcher et al. |
| 5,802,052 A | 9/1998 | Venkataraman |
| 5,812,550 A | 9/1998 | Sohn et al. |
| 5,815,516 A | 9/1998 | Aaker et al. |
| 5,825,772 A | 10/1998 | Dobbins et al. |
| 5,826,032 A | 10/1998 | Finn et al. |
| 5,875,296 A | 2/1999 | Shi et al. |
| 5,892,914 A | 4/1999 | Pitts |
| 5,892,932 A | 4/1999 | Kim |
| 5,919,247 A | 7/1999 | Van Hoff et al. |
| 5,936,939 A | 8/1999 | Des Jardins et al. |
| 5,941,988 A | 8/1999 | Bhagwat et al. |
| 5,946,690 A | 8/1999 | Pitts |
| 5,949,885 A | 9/1999 | Leighton |
| 5,951,694 A | 9/1999 | Choquier et al. |
| 5,959,990 A | 9/1999 | Frantz et al. |
| 5,974,460 A | 10/1999 | Maddalozzo, Jr. et al. |
| 5,983,281 A | 11/1999 | Ogle et al. |
| 5,988,847 A | 11/1999 | McLaughlin et al. |
| 6,006,260 A | 12/1999 | Barrick, Jr. et al. |
| 6,006,264 A | 12/1999 | Colby et al. |
| 6,026,452 A | 2/2000 | Pitts |
| 6,028,857 A | 2/2000 | Poor |
| 6,051,169 A | 4/2000 | Brown et al. |
| 6,078,956 A | 6/2000 | Bryant et al. |
| 6,085,234 A | 7/2000 | Pitts et al. |
| 6,092,196 A | 7/2000 | Reiche |
| 6,108,703 A | 8/2000 | Leighton et al. |
| 6,111,876 A | 8/2000 | Frantz et al. |
| 6,128,279 A | 10/2000 | O'Neil et al. |
| 6,128,657 A | 10/2000 | Okanoya et al. |
| 6,170,022 B1 | 1/2001 | Linville et al. |
| 6,178,423 B1 | 1/2001 | Douceur et al. |
| 6,182,139 B1 | 1/2001 | Brendel |
| 6,192,051 B1 | 2/2001 | Lipman et al. |
| 6,233,612 B1 | 5/2001 | Fruchtman et al. |
| 6,246,684 B1 | 6/2001 | Chapman et al. |
| 6,253,226 B1 | 6/2001 | Chidambaran et al. |
| 6,253,230 B1 | 6/2001 | Couland et al. |
| 6,263,368 B1 | 7/2001 | Martin |
| 6,289,012 B1 | 9/2001 | Harrington et al. |
| 6,298,380 B1 | 10/2001 | Coile et al. |
| 6,327,622 B1 | 12/2001 | Jindal et al. |
| 6,343,324 B1 | 1/2002 | Hubis et al. |
| 6,347,339 B1 | 2/2002 | Morris et al. |
| 6,360,270 B1 | 3/2002 | Cherkasova et al. |
| 6,374,300 B2 | 4/2002 | Masters |
| 6,396,833 B1 | 5/2002 | Zhang et al. |
| 6,430,562 B1 | 8/2002 | Kardos et al. |
| 6,434,081 B1 | 8/2002 | Johnson et al. |
| 6,442,687 B1 | 8/2002 | Savage |
| 6,484,261 B1 | 11/2002 | Wiegel |
| 6,490,624 B1 | 12/2002 | Sampson et al. |
| 6,510,135 B1 | 1/2003 | Almulhem et al. |
| 6,510,458 B1 | 1/2003 | Berstis et al. |
| 6,519,643 B1 | 2/2003 | Foulkes et al. |
| 6,601,084 B1 | 7/2003 | Bhaskaran et al. |
| 6,636,503 B1 | 10/2003 | Shiran et al. |
| 6,636,894 B1 | 10/2003 | Short et al. |
| 6,650,640 B1 | 11/2003 | Muller et al. |
| 6,650,641 B1 | 11/2003 | Albert et al. |
| 6,654,701 B2 | 11/2003 | Hatley |
| 6,683,873 B1 | 1/2004 | Kwok et al. |
| 6,691,165 B1 | 2/2004 | Bruck et al. |
| 6,708,187 B1 | 3/2004 | Shanumgam et al. |
| 6,742,045 B1 | 5/2004 | Albert et al. |
| 6,751,663 B1 | 6/2004 | Farrell et al. |
| 6,754,228 B1 | 6/2004 | Ludwig |
| 6,760,775 B1 | 7/2004 | Anerousis et al. |
| 6,772,219 B1 | 8/2004 | Shobatake |
| 6,779,039 B1 | 8/2004 | Bommareddy et al. |
| 6,781,986 B1 | 8/2004 | Sabaa et al. |
| 6,798,777 B1 | 9/2004 | Ferguson et al. |
| 6,807,173 B1 | 10/2004 | Lee et al. |
| 6,816,901 B1 | 11/2004 | Sitaraman et al. |
| 6,829,238 B2 | 12/2004 | Tokuyo et al. |
| 6,868,082 B1 | 3/2005 | Allen, Jr. et al. |
| 6,876,629 B2 | 4/2005 | Beshai et al. |
| 6,876,654 B1 | 4/2005 | Hegde |
| 6,888,836 B1 | 5/2005 | Cherkasova |
| 6,915,344 B1 | 7/2005 | Rowe et al. |
| 6,928,082 B2 | 8/2005 | Liu et al. |
| 6,950,434 B1 | 9/2005 | Viswanath et al. |
| 6,954,780 B2 | 10/2005 | Susai et al. |
| 6,957,272 B2 | 10/2005 | Tallegas et al. |
| 6,975,592 B1 | 12/2005 | Seddigh et al. |
| 6,987,763 B2 | 1/2006 | Rochberger et al. |
| 7,007,092 B2 | 2/2006 | Peiffer |
| 7,111,039 B2 | 9/2006 | Warren et al. |
| 7,113,993 B1 | 9/2006 | Cappiello et al. |
| 7,139,792 B1 | 11/2006 | Mishra et al. |
| 7,152,111 B2 | 12/2006 | Allred et al. |
| 7,228,422 B2 | 6/2007 | Morioka et al. |
| 7,283,470 B1 | 10/2007 | Sindhu et al. |
| 7,287,082 B1 | 10/2007 | O'Toole, Jr. |
| 7,308,703 B2 | 12/2007 | Wright et al. |
| 7,321,926 B1 | 1/2008 | Zhang et al. |
| 7,333,999 B1 | 2/2008 | Njemanze |
| 7,343,413 B2 | 3/2008 | Gilde et al. |
| 7,349,391 B2 | 3/2008 | Ben-Dor et al. |
| 7,350,040 B2 | 3/2008 | Marinescu |
| 7,398,552 B2 | 7/2008 | Pardee et al. |
| 7,454,480 B2 | 11/2008 | Labio et al. |
| 7,483,871 B2 | 1/2009 | Herz |
| 7,490,162 B1 | 2/2009 | Masters |
| 7,496,962 B2 | 2/2009 | Roelker et al. |
| 7,500,269 B2 | 3/2009 | Huotari et al. |
| 7,516,217 B2 | 4/2009 | Yodaiken |
| 7,526,541 B2 | 4/2009 | Roese et al. |
| 7,558,197 B1 | 7/2009 | Sindhu et al. |
| 7,580,971 B1 | 8/2009 | Gollapudi et al. |
| 7,624,424 B2 | 11/2009 | Morita et al. |
| 7,668,166 B1 | 2/2010 | Rekhter et al. |
| 7,706,261 B2 | 4/2010 | Sun et al. |
| 7,724,657 B2 | 5/2010 | Rao et al. |
| 7,801,978 B1 | 9/2010 | Susai et al. |
| 7,844,717 B2 | 11/2010 | Herz et al. |
| 7,876,677 B2 | 1/2011 | Cheshire |
| 7,908,314 B2 | 3/2011 | Yamaguchi et al. |
| 8,060,629 B2 | 11/2011 | Krawetz |
| 8,130,650 B2 | 3/2012 | Allen, Jr. et al. |
| 8,199,757 B2 | 6/2012 | Pani et al. |
| 8,351,333 B2 | 1/2013 | Rao et al. |
| 8,352,618 B2 | 1/2013 | Perez |
| 8,380,854 B2 | 2/2013 | Szabo |
| 8,447,871 B1 | 5/2013 | Szabo |
| 8,819,819 B1 | 8/2014 | Johnston et al. |
| 9,014,184 B2 | 4/2015 | Lwata et al. |
| 9,386,037 B1 | 7/2016 | Hunt et al. |
| 2001/0023442 A1 | 9/2001 | Masters |
| 2002/0059428 A1 | 5/2002 | Susai et al. |
| 2002/0138615 A1 | 9/2002 | Schmeling |
| 2002/0161913 A1 | 10/2002 | Gonzalez et al. |
| 2002/0198993 A1 | 12/2002 | Cudd et al. |
| 2003/0046291 A1 | 3/2003 | Fascenda |
| 2003/0070069 A1 | 4/2003 | Belapurkar et al. |
| 2003/0086415 A1 | 5/2003 | Bernhard et al. |
| 2003/0108052 A1 | 6/2003 | Inoue et al. |
| 2003/0140121 A1 | 7/2003 | Adams |
| 2003/0145062 A1 | 7/2003 | Sharma |
| 2003/0145233 A1 | 7/2003 | Poletto et al. |
| 2003/0225485 A1 | 12/2003 | Fritz et al. |

(56) References Cited

U.S. PATENT DOCUMENTS

| | | |
|---|---|---|
| 2003/0225897 A1 | 12/2003 | Krawetz |
| 2004/0003287 A1 | 1/2004 | Zissimopoulos et al. |
| 2004/0006590 A1 | 1/2004 | Lucovsky et al. |
| 2004/0093372 A1 | 5/2004 | Chen et al. |
| 2004/0098495 A1 | 5/2004 | Warren et al. |
| 2004/0103283 A1 | 5/2004 | Hornak |
| 2004/0111463 A1 | 6/2004 | Amon et al. |
| 2004/0117493 A1 | 6/2004 | Bazot et al. |
| 2004/0148328 A1 | 7/2004 | Matsushima |
| 2004/0267920 A1 | 12/2004 | Hydrie et al. |
| 2004/0268358 A1 | 12/2004 | Darling et al. |
| 2005/0004887 A1 | 1/2005 | Igakura et al. |
| 2005/0021736 A1 | 1/2005 | Carusi et al. |
| 2005/0044213 A1 | 2/2005 | Kobayashi et al. |
| 2005/0052440 A1 | 3/2005 | Kim et al. |
| 2005/0055435 A1 | 3/2005 | Gbadegesin et al. |
| 2005/0108578 A1 | 5/2005 | Tajalli et al. |
| 2005/0122977 A1 | 6/2005 | Lieberman |
| 2005/0154837 A1 | 7/2005 | Keohane et al. |
| 2005/0187866 A1 | 8/2005 | Lee |
| 2005/0188220 A1 | 8/2005 | Nilsson et al. |
| 2005/0198099 A1 | 9/2005 | Motsinger et al. |
| 2005/0262238 A1 | 11/2005 | Reeves et al. |
| 2006/0021004 A1 | 1/2006 | Moran et al. |
| 2006/0031520 A1 | 2/2006 | Bedekar et al. |
| 2006/0059267 A1 | 3/2006 | Cugi et al. |
| 2006/0095585 A1 | 5/2006 | Meijs et al. |
| 2006/0095956 A1 | 5/2006 | Ashley et al. |
| 2006/0156416 A1 | 7/2006 | Huotari et al. |
| 2006/0161577 A1 | 7/2006 | Kulkarni et al. |
| 2006/0171365 A1 | 8/2006 | Borella |
| 2006/0184647 A1 | 8/2006 | Dixit et al. |
| 2006/0233106 A1 | 10/2006 | Achlioptas et al. |
| 2006/0233155 A1 | 10/2006 | Srivastava |
| 2006/0242300 A1 | 10/2006 | Yumoto et al. |
| 2006/0265510 A1 | 11/2006 | Warren et al. |
| 2007/0016662 A1 | 1/2007 | Desai et al. |
| 2007/0064661 A1 | 3/2007 | Sood et al. |
| 2007/0107048 A1 | 5/2007 | Halls et al. |
| 2007/0118879 A1 | 5/2007 | Yeun |
| 2007/0174491 A1 | 7/2007 | Still |
| 2007/0220598 A1 | 9/2007 | Salowey et al. |
| 2007/0297551 A1 | 12/2007 | Choi |
| 2008/0034136 A1 | 2/2008 | Ulenas |
| 2008/0072303 A1 | 3/2008 | Syed |
| 2008/0133518 A1 | 6/2008 | Kapoor et al. |
| 2008/0134311 A1 | 6/2008 | Medvinsky et al. |
| 2008/0148340 A1 | 6/2008 | Powell |
| 2008/0201599 A1 | 8/2008 | Ferraiolo et al. |
| 2008/0256224 A1 | 10/2008 | Kaji et al. |
| 2008/0301760 A1 | 12/2008 | Lim |
| 2009/0028337 A1 | 1/2009 | Balabine et al. |
| 2009/0031054 A1 | 1/2009 | Kato |
| 2009/0049230 A1 | 2/2009 | Pandya |
| 2009/0119504 A1 | 5/2009 | van Os et al. |
| 2009/0125625 A1 | 5/2009 | Shim |
| 2009/0138749 A1 | 5/2009 | Moll et al. |
| 2009/0141891 A1 | 6/2009 | Boyen et al. |
| 2009/0228956 A1 | 9/2009 | He et al. |
| 2009/0287935 A1 | 11/2009 | Aull et al. |
| 2010/0071048 A1 | 3/2010 | Novak et al. |
| 2010/0122091 A1 | 5/2010 | Huang et al. |
| 2010/0138551 A1 | 6/2010 | Degaonkar et al. |
| 2010/0150154 A1 | 6/2010 | Viger et al. |
| 2010/0242092 A1 | 9/2010 | Harris et al. |
| 2010/0251330 A1 | 9/2010 | Kroeselberg et al. |
| 2010/0325277 A1 | 12/2010 | Muthiah et al. |
| 2011/0040889 A1 | 2/2011 | Garrett et al. |
| 2011/0047620 A1 | 2/2011 | Mahaffey et al. |
| 2011/0066718 A1 | 3/2011 | Susai et al. |
| 2011/0137973 A1 | 6/2011 | Wei et al. |
| 2011/0153827 A1 | 6/2011 | Yengalasetti et al. |
| 2011/0153831 A1 | 6/2011 | Mutnuru et al. |
| 2011/0173295 A1 | 7/2011 | Bakke et al. |
| 2011/0273984 A1 | 11/2011 | Hsu et al. |
| 2011/0282997 A1 | 11/2011 | Prince et al. |
| 2011/0321122 A1 | 12/2011 | Mwangi et al. |
| 2012/0066489 A1 | 3/2012 | Ozaki et al. |
| 2012/0246637 A1 | 9/2012 | Kreeger et al. |
| 2013/0086195 A1 | 4/2013 | Riniker |
| 2013/0179985 A1 | 7/2013 | Strassmann et al. |
| 2013/0346492 A1 | 12/2013 | Wang et al. |
| 2014/0207926 A1 | 7/2014 | Benny |
| 2014/0237241 A1 | 8/2014 | Kurosawa et al. |
| 2014/0281535 A1 | 9/2014 | Kane et al. |
| 2016/0014094 A1 | 1/2016 | Kurabayashi |
| 2016/0051199 A1 | 2/2016 | Tishutin et al. |
| 2016/0212101 A1 | 7/2016 | Reshadi et al. |
| 2017/0048245 A1 | 2/2017 | Owen et al. |
| 2017/0105142 A1* | 4/2017 | Hecht ................. H04L 67/02 |

FOREIGN PATENT DOCUMENTS

| | | |
|---|---|---|
| WO | 1995/005712 A2 | 2/1995 |
| WO | 1997/009805 A1 | 3/1997 |
| WO | 1997/045800 A1 | 12/1997 |
| WO | 1999/005829 A1 | 2/1999 |
| WO | 1999/006913 A1 | 2/1999 |
| WO | 1999/010858 A2 | 3/1999 |
| WO | 1999/039373 A2 | 8/1999 |
| WO | 1999/064967 A1 | 12/1999 |
| WO | 2000/004422 A2 | 1/2000 |
| WO | 2000/004458 A1 | 1/2000 |
| WO | 2011/079198 A2 | 6/2011 |

OTHER PUBLICATIONS

"Application Layer Processing (ALP)," Crescendo Networks, Chapter 9, pp. 168-186, 2003-2009.

"A Process for Selective Routing of Servlet Content to Transcoding Modules," Research Disclosure 422124, IBM Corporation, pp. 889-890, Jun. 1999.

"BIG-IP Controller With Exclusive OneConnect Content Switching Features Provides a Breakthrough System For Maximizing Server and Network Performance," Press Release, F5 Networks, Inc., Las Vegas, Nevada, 2 pp, May 8, 2001.

Fielding et al., "Hypertext Transfer Protocol—HTTP/1.1," Network Working Group, Request for Comments 2068, Category Standards Track, pp. 1-162, Jan. 1997.

Fielding et al., "Hypertext Transfer Protocol—HTTP/1.1," Network Working Group, Request for Comments 2616, Obsoletes 2068, Category Standards Track, pp. 1-176, Jun. 1999.

Floyd et al., "Random Early Detection Gateways for Congestions Avoidance," IEEE/ACM Transactions on Networking, pp. 1-22, Aug. 1993.

Hochmuth, Phil. "F5, CacheFlow Pump Up Content-Delivery Lines," Network World Fusion, 1 pp, May 4, 2001.

"Servlet/Applet/HTML Authentication Process With Single Sign-On," Research Disclosure 429128, IBM Corportion, pp. 163-164. Jan. 2000.

"Traffic Surges: Attack or Legitimate," Powerpoint Presentation, Slides 1-12, Citrix Systems, Inc., 2005.

Macvittie, Lori, "Message-Based Load Balancing," F5 Networks, Inc., Technical Brief, pp. 1-9, 2010.

Abad et al., "An Analysis on the Schemes for Detecting and Preventing ARP Cache Poisoning Attacks," 27th International Conference on Distributed Computing Systems Workshops, IEEE Computer Society, pp. 1-8, Jun. 22-29, 2007.

"Testing for Cross Site Scripting," OWSAP Testing Guide, Version 2, pp. 1-5, Jul. 27, 2011.

"Principal Names and DNS," MIT Kerberos Documentation, Kerberos Consortium, pp. 1-3, Jan. 1, 1999 (retrieved on Jun. 19, 2013).

Zhu et al, "Generating KDC Referrals to Locate Kerberos Realms," Network Working Group, Internet-Draft, Obsoletes 2478 (if approved), Microsoft Corporation, pp. 1-17, Oct. 25, 2004.

International Search Report and Written Opinion for International Application No. PCT/US/2013/026615, filed Feb. 19, 2013, 10 pp, dated Jul. 4, 2013.

(56) References Cited

OTHER PUBLICATIONS

"Configuration Guide for Local Traffic Management," Version 9.2.2, Publication No. MAN-0182-01, F5 Networks, Inc., pp. 1-406, Jan. 12, 2006.
Leffler et al., "Trailer Encapsulations," Network Working Group, Request for Comments 893, pp. 1-6, Apr. 1984.
Braden, R., "Requirements for Internet Hosts—Communication Layers," Network Working Group, Request for comments 1122, Internet Engineering Task Force, Oct. 1989.
"BIG-IP® Application Security Manager™: Implementations," Version 11.6, Publication No. MAN-0358-07, F5 Networks, Inc., pp. 1-420, Aug. 20. 2014.
Murphy, Alan, "Managing IPv6 Throughout the Application Delivery Network," F5 Networks, Inc., White Paper, pp. 1-10, Jun. 5, 2012.
"Managing IPv6 in Service Provider Networks With BIG-IP Devices," Solution Profile/Service Provider, F5 Networks, Inc., 2 pp, 2010.
"Carrier-Grade NAT and IPv6 Gateway," Solution Profile/IPv4 and IPv6 Solutions, F5 Networks, Inc., 2 pp, 2012.
"VMware Virtual Networking Concepts," Information Guide, Item: IN-18-INF-01-01, pp. 1-12, Jul. 18, 2007.

\* cited by examiner

_US 11,044,200 B1_

METHODS FOR SERVICE STITCHING USING A PACKET HEADER AND DEVICES THEREOF

This application claims the benefit of U.S. Provisional Patent Application Ser. No. 62/694,636, filed Jul. 6, 2018, which is hereby incorporated by reference in its entirety.

FIELD

This technology generally relates to methods and devices for network traffic management and, more particularly, to methods for service stitching using packet header and devices thereof.

BACKGROUND

Network service providers provide network services, such as security, tunneling, virtual private networks, filtering, or load-balancing by way of example, to client devices. To provide these services, these network service providers typically use dedicated network traffic management devices configured to manage and provide network services using service chains. These service chains identify a set of the service functions to be applied to network packet flows in order to provide a particular network service. Accordingly, every time a network service is required, a set of functions are applied on the network packets associated with a client device. Unfortunately, applying the set of functions on each network packet adds latency to the overall flow of the network packet. Further, with this process of determining when to apply the set of functions, prior technologies have failed to take into account a previous trust that was established between the client and the network traffic management device.

SUMMARY

A method for service stitching using a packet header includes identifying a type of service (TO S) or differentiated services code point (DSCP) value in a header field in each of a plurality of received network packets. One or more value added service chains are identified based on the identified TOS or DSCP value. The plurality of network packets are forwarded to a destination after processing each of the plurality of network packets through the identified one or more value added service chains.

A non-transitory computer readable medium having stored thereon instructions for service stitching using a packet header comprising machine executable code which when executed by at least one processor, causes the processor to identify a type of service (TOS) or differentiated services code point (DSCP) value in a header field in each of a plurality of received network packets. One or more value added service chains are identified based on the identified TOS or DSCP value. The plurality of network packets are forwarded to a destination after processing each of the plurality of network packets through the identified one or more value added service chains.

A network traffic management apparatus including at least one of configurable hardware logic configured to be capable of implementing or a processor coupled to a memory and configured to execute programmed instructions stored in the memory to identify a type of service (TOS) or differentiated services code point (DSCP) value in a header field in each of a plurality of received network packets. One or more value added service chains are identified based on the identified TOS or DSCP value. The plurality of network packets are forwarded to a destination after processing each of the plurality of network packets through the identified one or more value added service chains.

A network traffic management system, comprising one or more traffic management apparatuses, client devices, or server devices, the network traffic management system comprising memory comprising programmed instructions stored thereon and one or more processors configured to be capable of executing the stored programmed instructions to identify a type of service (TOS) or differentiated services code point (DSCP) value in a header field in each of a plurality of received network packets. One or more value added service chains are identified based on the identified TOS or DSCP value. The plurality of network packets are forwarded to a destination after processing each of the plurality of network packets through the identified one or more value added service chains.

This technology provides a number of advantages including providing a method, non-transitory computer readable medium, apparatus, and system that assist with service stitching using a packet header. By using the techniques illustrated below, the technology significantly reduces the latency associated with service chaining by selectively applying the service functions on the network packets.

DETAILED DESCRIPTION

Figure 1:
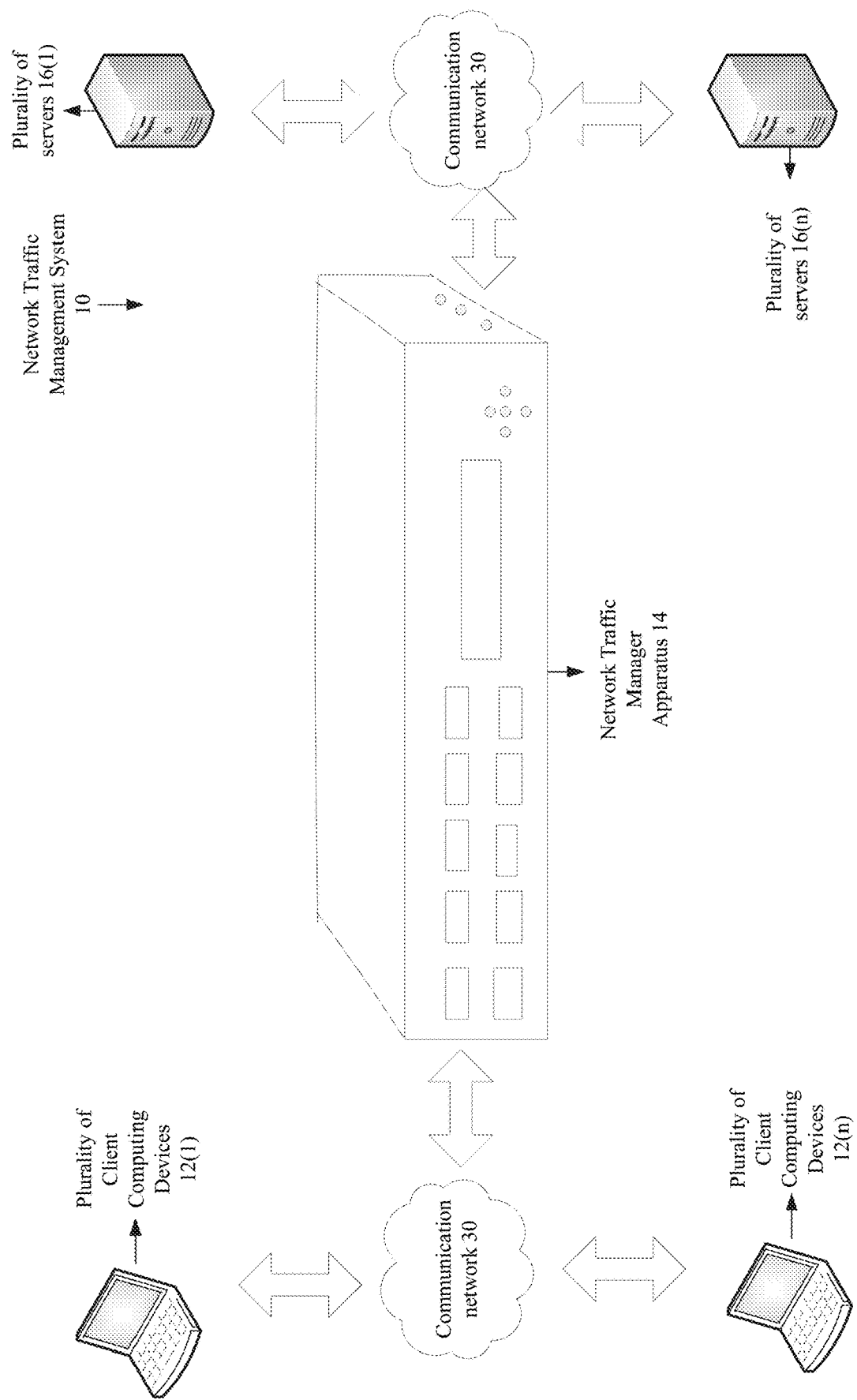
FIG. 1 is an example of a block diagram of a network traffic management system including a network traffic management apparatus for service stitching using a packet header.
Figure 2:
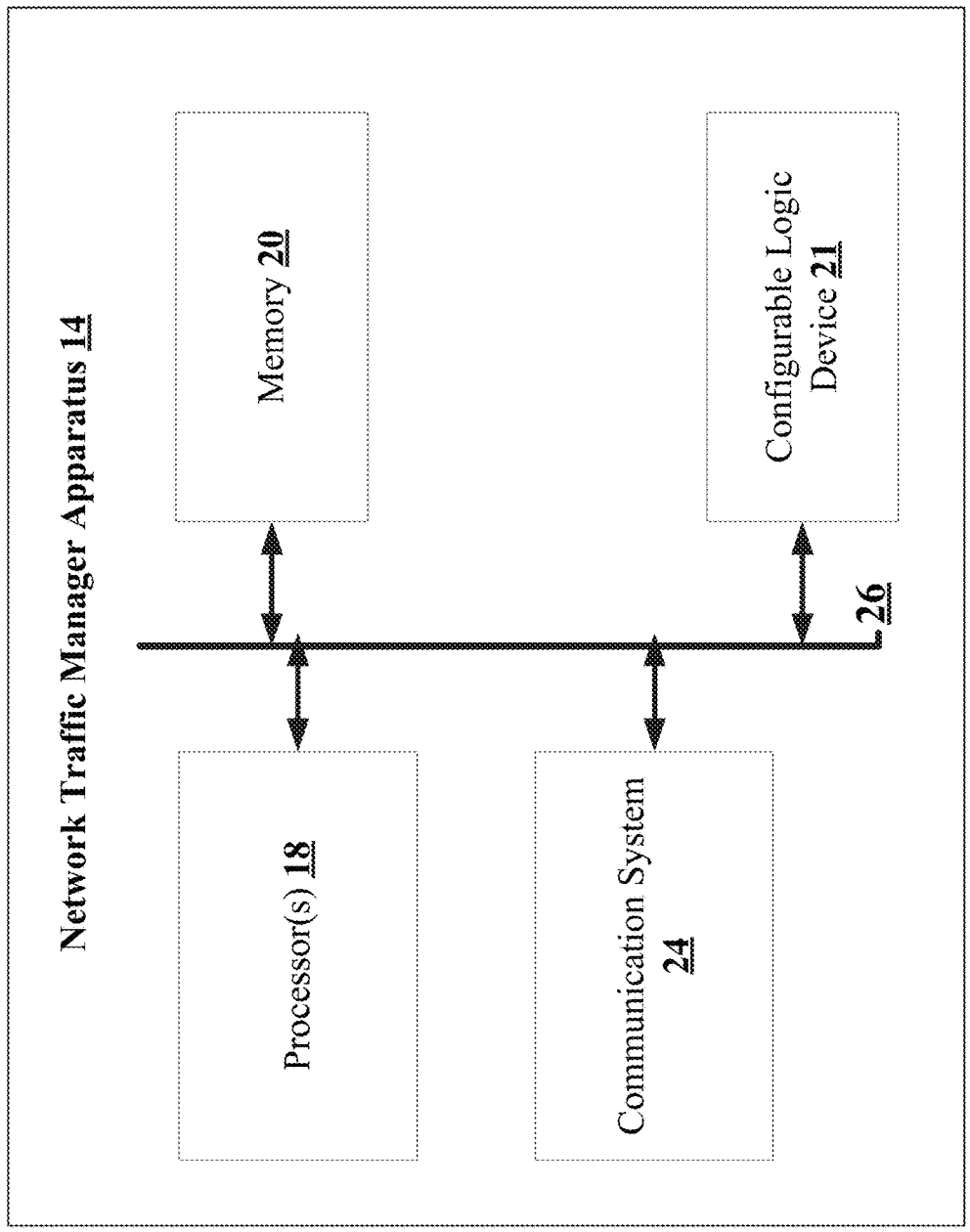
FIG. 2 is an example of a block diagram of a network traffic management apparatus.

An example of a network environment 10 which incorporates a network traffic management system for service stitching using a packet header with the network traffic manager apparatus 14 is illustrated in FIGS. 1 and 2. The exemplary environment 10 includes a plurality of client computing devices 12(1)-12(n), a network traffic manager apparatus 14, and a plurality of servers 16(1)-16(n) which are coupled together by communication networks 30, although the environment can include other types and numbers of systems, devices, components, and/or elements and in other topologies and deployments. While not shown, the exemplary environment 10 may include additional network components, such as routers, switches and other devices, which are well known to those of ordinary skill in the art and thus will not be described here. This technology provides a number of advantages including providing methods, non-transitory computer readable media, and devices that manage a flow of a packet through a value added service chain without needing to repeatedly reclassify the flow.

Referring more specifically to FIGS. 1 and 2, the network traffic manager apparatus 14 of the network traffic management system is coupled to the plurality of client computing devices 12(1)-12(n) through the communication network 30, although the plurality of client computing devices 12(1)-12(n) and network traffic manager apparatus 14 may be coupled together via other topologies. Additionally, the network traffic manager apparatus 14 is coupled to the plurality of servers 16(1)-16(n) through the communication network 30, although the servers 16(1)-16(n) and the network traffic manager apparatus 14 may be coupled together via other topologies.

The network traffic manager apparatus 14 assists with service stitching using a packet header as illustrated and described by way of the examples herein, although the network traffic manager apparatus 14 may perform other types and/or numbers of functions. As illustrated in FIG. 2, the network traffic manager apparatus 14 includes processor or central processing unit (CPU) 18, memory 20, optional configurable hardware logic 21, and a communication system 24 which are coupled together by a bus device 26 although the network traffic manager apparatus 14 may comprise other types and numbers of elements in other configurations. In this example, the bus 26 is a PCI Express bus in this example, although other bus types and links may be used.

The processors 18 within the network traffic manager apparatus 14 may execute one or more computer-executable instructions stored in memory 20 for the methods illustrated and described with reference to the examples herein, although the processor can execute other types and numbers of instructions and perform other types and numbers of operations. The processor 18 may comprise one or more central processing units ("CPUs") or general purpose processors with one or more processing cores, such as AMD® processor(s), although other types of processor(s) could be used (e.g., Intel®).

Figure 3:
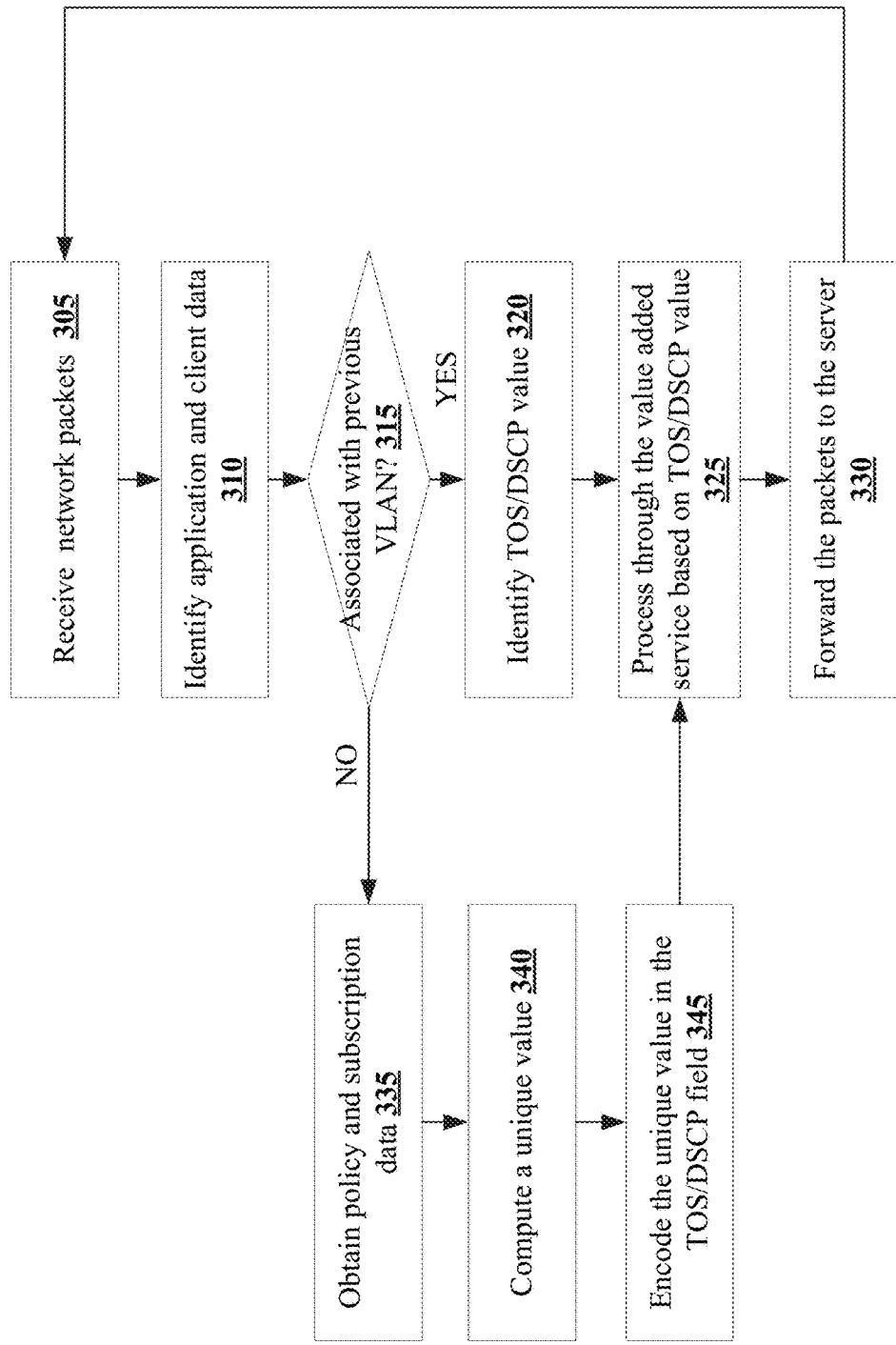
FIG. 3 is an exemplary flowchart of a method for service stitching using a packet header.
Figure 4:
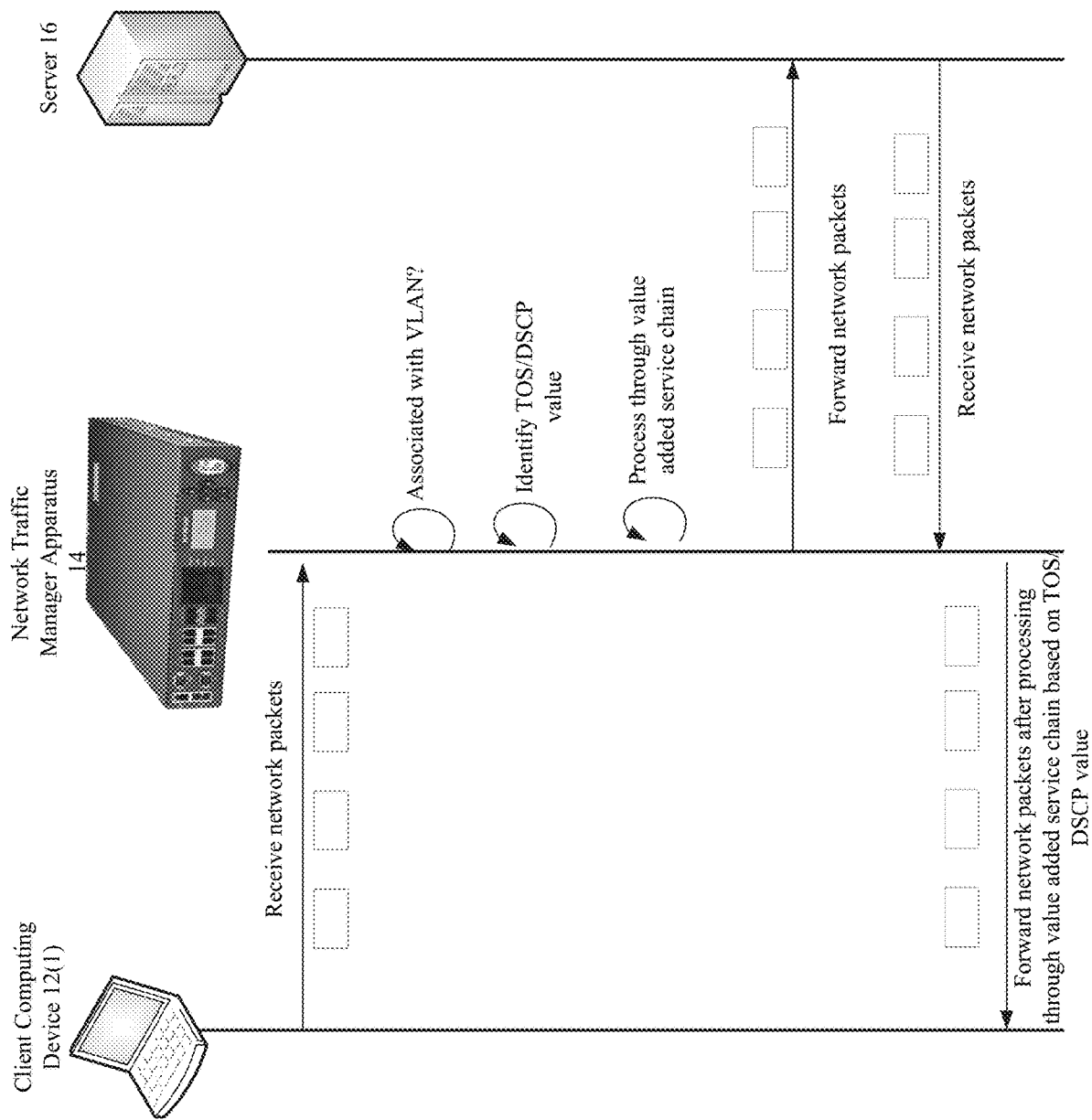
FIG. 4 is an exemplary sequence diagram for service stitching using a packet header.

The memory 20 within the network traffic manager apparatus 14 may comprise one or more tangible storage media, such as RAM, ROM, flash memory, CD-ROM, floppy disk, hard disk drive(s), solid state memory, DVD, or any other memory storage types or devices, including combinations thereof, which are known to those of ordinary skill in the art. The memory 20 may store one or more non-transitory computer-readable instructions of this technology as illustrated and described with reference to the examples herein that may be executed by the processor 18. The exemplary flowchart shown in FIG. 3 is representative of example steps or actions of this technology that may be embodied or expressed as one or more non-transitory computer or machine readable instructions stored in the memory 20 that may be executed by the processor 18 and/or may be implemented by configured logic in the optional configurable logic 21.

Accordingly, the memory 20 of the network traffic manager apparatus 14 can store one or more applications that can include computer executable instructions that, when executed by the network traffic manager apparatus 14, causes the network traffic manager apparatus 14 to perform actions, such as to transmit, receive, or otherwise process messages, for example, and to perform other actions described and illustrated below with reference to FIG. 3. The application(s) can be implemented as module or components of another application. Further, the application(s) can be implemented as operating system extensions, module, plugins, or the like. The application(s) can be implemented as module or components of another application. Further, the application(s) can be implemented as operating system extensions, module, plugins, or the like. Even further, the application(s) may be operative in a cloud-based computing environment. The application(s) can be executed within virtual machine(s) or virtual server(s) that may be managed in a cloud-based computing environment. Also, the application(s), including the network traffic manager apparatus 14 itself, may be located in virtual server(s) running in a cloud-based computing environment rather than being tied to one or more specific physical network computing devices. Also, the application(s) may be running in one or more virtual machines (VMs) executing on the network traffic manager apparatus 14. Additionally, in at least one of the various embodiments, virtual machine(s) running on the network traffic manager apparatus 14 may be managed or supervised by a hypervisor.

The optional configurable hardware logic device 21 in the network traffic manager apparatus 14 may comprise specialized hardware configured to implement one or more steps of this technology as illustrated and described with reference to the examples herein. By way of example only, the optional configurable logic hardware device 21 may comprise one or more of field programmable gate arrays ("FPGAs"), field programmable logic devices ("FPLDs"), application specific integrated circuits (ASICs") and/or programmable logic units ("PLUs").

The communication system 24 in the network traffic manager apparatus 14 is used to operatively couple and communicate between the network traffic manager apparatus 14, the plurality of client computing devices 12(1)-12(n), and the plurality of servers 16(1)-16(n) which are all coupled together by communication network 30 such as one or more local area networks (LAN) and/or the wide area network (WAN), although other types and numbers of communication networks or systems with other types and numbers of connections and configurations to other devices and elements may be used. By way of example only, the communication network such as local area networks (LAN) and the wide area network (WAN) can use TCP/IP over Ethernet and industry-standard protocols, including NFS, CIFS, SOAP, XML, LDAP, and SNMP, although other types and numbers of communication networks, can be used. In this example, the bus 26 is a PCI Express bus in this example, although other bus types and links may be used.

Each of the plurality of client computing devices 12(1)-12(n) of the network traffic management system 10, include a central processing unit (CPU) or processor, a memory, input/display device interface, configurable logic device and an input/output system or I/O system, which are coupled together by a bus or other link. The plurality of client computing devices 12(1)-12(n), in this example, may run interface applications, such as Web browsers, that may provide an interface to make requests for and send and/or receive data to and/or from the web application servers 16(1)-16(n) via the network traffic manager apparatus 14. Additionally, the plurality of client computing devices 12(1)-12(n) can include any type of computing device that can receive, render, and facilitate user interaction, such as client computers, network computer, mobile computers, mobile phones, virtual machines (including cloud-based computer), or the like. Each of the plurality of client computing devices 12(1)-12(n) utilizes the network traffic manager apparatus 14 to conduct one or more operations with the web application servers 16(1)-16(n), such as to obtain data and/or access the applications from one of the web application servers 16(1)-16(n), by way of example only, although other numbers and/or types of systems could be utilizing these resources and other types and numbers of functions utilizing other types of protocols could be performed.

Each of the plurality of servers 16(1)-16(n) of the network traffic management system include a central processing unit (CPU) or processor, a memory, and a communication system, which are coupled together by a bus or other link, although other numbers and/or types of network devices could be used. Generally, the plurality of servers 16(1)-16(n) process requests for providing access to one or more enterprise web applications received from the plurality of client computing devices 12(1)-12(n), network traffic manager apparatus 14, via the communication network 30 according to the HTTP-based application RFC protocol or the CIF S or NFS protocol in this example, but the principles discussed herein are not limited to this example and can include other application protocols. A series of applications may run on the plurality web application servers 16(1)-16(n) that allows the transmission of applications requested by the plurality of client computing devices 12(1)-12(n), or the network traffic manager apparatus 14. The plurality of servers 16(1)-16(n) may provide data or receive data in response to requests directed toward the respective applications on the plurality of servers 16(1)-16(n) from the plurality of client computing devices 12(1)-12(n) or the network traffic manager apparatus 14. It is to be understood that the plurality of servers 16(1)-16(n) may be hardware or software or may represent a system with multiple external resource servers, which may include internal or external networks. In this example the plurality of servers 16(1)-16(n) may be any version of Microsoft® IIS servers or Apache® servers, although other types of servers may be used.

Although the plurality of servers 16(1)-16(n) are illustrated as single servers, each of the plurality of servers 16(1)-16(n) may be distributed across one or more distinct network computing devices. Moreover, the plurality of servers 16(1)-16(n) are not limited to a particular configuration. Thus, the plurality of plurality web application servers 16(1)-16(n) may contain a plurality of network computing devices that operate using a master/slave approach, whereby one of the network computing devices of the plurality of servers 16(1)-16(n) operate to manage and/or otherwise coordinate operations of the other network computing devices. The plurality of servers 16(1)-16(n) may operate as a plurality of network computing devices within cluster architecture, a peer-to peer architecture, virtual machines, or within a cloud architecture.

Thus, the technology disclosed herein is not to be construed as being limited to a single environment and other configurations and architectures are also envisaged. For example, the one or more of the plurality of servers 16(1)-16(n) depicted in FIG. 1 can operate within network traffic manager apparatus 14 rather than as a stand-alone server communicating with network traffic manager apparatus 14 via the communication network(s) 30. In this example the plurality of servers 16(1)-16(n) operate within the memory 20 of the network traffic manager apparatus 14.

While the network traffic manager apparatus 14 is illustrated in this example as including a single device, the network traffic manager apparatus 14 in other examples can include a plurality of devices or blades each with one or more processors each processor with one or more processing cores that implement one or more steps of this technology. In these examples, one or more of the devices can have a dedicated communication interface or memory. Alternatively, one or more of the devices can utilize the memory, communication interface, or other hardware or software components of one or more other communicably coupled of the devices. Additionally, one or more of the devices that together comprise network traffic manager apparatus 14 in other examples can be standalone devices or integrated with one or more other devices or applications, such as one of the plurality of servers 16(1)-16(n) or, the network traffic manager apparatus 14, or applications coupled to the communication network(s), for example. Moreover, one or more of the devices of the network traffic manager apparatus 14 in these examples can be in a same or a different communication network 30 including one or more public, private, or cloud networks, for example.

Although an exemplary network traffic management system 10 with the plurality of client computing devices 12(1)-12(n), the network traffic manager apparatus 14, and the plurality of servers 16(1)-16(n), communication networks 30 are described and illustrated herein, other types and numbers of systems, devices, blades, components, and elements in other topologies can be used. It is to be understood that the systems of the examples described herein are for exemplary purposes, as many variations of the specific hardware and software used to implement the examples are possible, as will be appreciated by those skilled in the relevant art(s).

Further, each of the systems of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

One or more of the components depicted in the network traffic management system, such as the network traffic manager apparatus 14, the plurality of client computing devices 12(1)-12(n), the plurality of servers 16(1)-16(n), for example, may be configured to operate as virtual instances on the same physical machine. In other words, one or more of network traffic manager apparatus 14, the plurality of client computing devices 12(1)-12(n), or the plurality of servers 16(1)-16(n) illustrated in FIG. 1 may operate on the same physical device rather than as separate devices communicating through a network as depicted in FIG. 1. There may be more or fewer plurality of client computing devices 12(1)-12(n), network traffic manager apparatus 14, or the plurality of servers 16(1)-16(n) than depicted in FIG. 1. The plurality of client computing devices 12(1)-12(n), the plurality of servers 16(1)-16(n) could be implemented as applications on network traffic manager apparatus 14.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples also may be embodied as a non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

An example of a method for service stitching using a packet header will now be described with reference to FIGS. 1-4. First in step 305, the network traffic manager apparatus 14 receives a plurality of network packets from one of the plurality of client devices 12(1)-12(n) directed to the one of the plurality of servers 16(1)-16(n), although the network traffic manager apparatus 14 can receive other types or amounts of information and from other sources. In this example, the network traffic manager apparatus 14 receives the plurality of network packets through a virtual local area network (VLAN), although the network traffic manager apparatus 14 can receive the plurality of network packets through other types of network connections.

In step 310, the network traffic manager apparatus 14 identifies a type of application and data associated with the requesting one of the plurality of client computing devices 12(1)-12(n). In this example, the type of application and the data associated with the requesting one of the plurality of client computing devices 12(1)-12(n) can be identified through the header and payload data of the received plurality of packets, although the network traffic manager apparatus 14 can identify the type of application and the data associated with the requesting one of the plurality of client computing devices 12(1)-12(n) using other types of techniques.

Next in step 315, the network traffic manager apparatus 14 determines if each of the received plurality of network packets are related to a flow of network packets associated with a previously established VLAN between the requesting one of the plurality of client computing devices 12(1)-12(n) based on the identified type of application and the client device data. Alternatively, the network traffic manager apparatus 14 can determine if the received plurality of network packets relate to a previously established VLAN using other types of parameters and techniques. Accordingly, when the network traffic manager apparatus 14 determines that the received plurality of network packets are associated with the previously established VLAN, then the Yes branch is taken to step 320.

In step 320, the network traffic manager apparatus 14 identifies the type of service (TOS) or the differentiated service code point (DSCP) value in the header of the received plurality of network packets. In this example, the TOS or DSCP value is a value that was previously encoded by the network traffic manager apparatus 14 on the previously established VLAN. Further, in this example the TOS or DSCP value corresponds to a value added service chain that the received plurality of packets belongs to. Although in this example the network traffic manager apparatus 14 uses the TOS or DSCP value, the network traffic manager apparatus 14 can use other techniques to determine the value added service chain of each of the plurality of network packets.

Next in step 325, the network traffic manager apparatus 14 processes each of the received plurality of network packets through a sequence of value added service chains based on the identified TOS/DSCP value. In this example, the TOS/DSCP value in the header of each of the network packets would remain unchanged when it is processed by each of the value added services and by using this technique, the network traffic manager apparatus 14 does not have to compute a new TOS/DSCP value for a new value added service chain. Additionally in this example, the network traffic manager apparatus 14 can use the previously used VLAN, the last completed value added service along with the TOS/DSCP value to identify and process the received plurality of packets through the value added service chain.

Next in step 330, the network traffic manager apparatus 14 forwards each of the received plurality of network packets that has been processed through the value added service chain to the corresponding one of the plurality of servers 16(1)-16(n).

If back in step 315 the network traffic manager apparatus 14 determines that the received plurality of network packets are not related to a previous VLAN connection, then the No branch is taken to step 335.

In step 335, the network traffic manager apparatus 14 obtains a policy and the subscription data associated with the requesting one of the plurality of client devices 12(1)-12(n) and the type of application being accessed. In this example, the memory 20 of the network traffic manager apparatus 14 includes a table with the data associated with the requesting one of the plurality of client computing devices 12(1)-12(n) and the type of application being accessed and the corresponding subscription and the policies. Additionally in this example, the obtained subscription and the policy data includes data associated with the value added service chain that the received plurality of network packets has to be processed, although the subscription and the policy data can include other types and/or amounts of information.

In step 340, the network traffic manager apparatus 14 computes a unique value for each of the received plurality of packets based on the obtained policy and the subscription data, although the network traffic manager apparatus 14 can compute the unique value for each of the received plurality of packets using different techniques.

In step 345, the network traffic manager apparatus 14 encodes the computed unique value in the TOS/DSCP header field for each of the received plurality of network packets and the exemplary flow proceeds to step 325 as described above.

In another example, the network traffic manager apparatus 14 can translate the source port to a network address translation (NAT) port and encode the unique value associated with the value added service chain to the source port field of the header. In other words, the network traffic manager apparatus 14 can identify the value added service chain associated with the received plurality of network packets based on the value encoded in the source port field of the header and can then accordingly process the packets through the value added service chain.

Having thus described the basic concept of the technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations therefore, is not intended to limit the claimed processes to any order except as may be specified in the claims. Accordingly, the technology is limited only by the following claims and equivalents thereto.

What is claimed is:

1. A method for service stitching using a packet header, the method implemented by a network traffic management system comprising one or more network traffic apparatuses, client devices, or server devices, the method comprising:

identifying a type of service (TOS) or differentiated services code point (DSCP) value in a header field in each of a plurality of received network packets;

identifying a value added service chain based on the identified TOS or DSCP value, the identifying further comprising computing a unique value indicative of the identified value added service chain for each of the received plurality of network packets based on obtained policy data and subscription data and encoding the computed unique value into the identified TOS or DSCP header field for each of the received plurality of network packets; and forwarding the plurality of network packets to a destination after processing each of the plurality of network packets through the identified value added service chain based on the encoded unique value.

2. The method as set forth in claim 1 further comprising, obtaining requested application data and client data from each of the received plurality of network packets.

3. The method as set forth in claim 1 further comprising, determining when each of the received plurality of network packets are associated with an existing network connection.

4. The method as set forth in claim 2 further comprising, obtaining the policy data and the subscription data associated with the application data and the client data when any of the received plurality of network packets are unassociated with any existing network connection.

5. A non-transitory computer readable medium having stored thereon instructions for service stitching using a packet header comprising executable code which when executed by one or more processors, causes the processors to:

identify a type of service (TOS) or differentiated services code point (DSCP) value in a header field in each of a plurality of received network packets;

identify a value added service chain based on the identified TOS or DSCP value, the identifying further comprising computing a unique value indicative of the identified value added service chain for each of the received plurality of network packets based on obtained policy data and subscription data and encoding the computed unique value into the identified TOS or DSCP header field for each of the received plurality of network packets; and forward the plurality of network packets to a destination after processing each of the plurality of network packets through the identified value added service chain based on the encoded unique value.

6. The medium as set forth in claim 5 further comprising, obtain requested application data and client data from each of the received plurality of network packets.

7. The medium as set forth in claim 6 further comprising, determine when each of the received plurality of network packets are associated with an existing network connection.

8. The medium as set forth in claim 6 further comprising, obtain the policy data and the subscription data associated with the application data and the client data when any of the received plurality of network packets are unassociated with any existing network connection.

9. A network traffic manager apparatus, comprising memory comprising programmed instructions stored in the memory and one or more processors configured to be capable of executing the programmed instructions stored in the memory to:

identify a type of service (TOS) or differentiated services code point (DSCP) value in a header field in each of a plurality of received network packets;

identify a value added service chain based on the identified TOS or DSCP value, the identifying further comprising computing a unique value indicative of the identified value added service chain for each of the received plurality of network packets based on obtained policy data and subscription data and encoding the computed unique value into the identified TOS or DSCP header field for each of the received plurality of network packets; and forward the plurality of network packets to a destination after processing each of the plurality of network packets through the identified value added service chain based on the encoded unique value.

10. The apparatus as set forth in claim 9 wherein the one or more processors are further configured to be capable of executing the programmed instructions stored in the memory to obtain requested application data and client data from each of the received plurality of network packets.

11. The apparatus as set forth in claim 9 wherein the one or more processors are further configured to be capable of executing the programmed instructions stored in the memory to determine when each of the received plurality of network packets are associated with an existing network connection.

12. The apparatus as set forth in claim 10 wherein the one or more processors are further configured to be capable of executing the programmed instructions stored in the memory to obtain the policy data and the subscription data associated with the application data and the client data when any of the received plurality of network packets are unassociated with any existing network connection.

13. A network traffic management system, comprising one or more traffic management apparatuses, client devices, or server devices, the network traffic management system comprising memory comprising programmed instructions stored thereon and one or more processors configured to be capable of executing the stored programmed instructions to:

identify a type of service (TOS) or differentiated services code point (DSCP) value in a header field in each of a plurality of received network packets;

identify a value added service chain based on the identified TOS or DSCP value, the identifying further comprising computing a unique value indicative of the identified value added service chain for each of the received plurality of network packets based on obtained policy data and subscription data, and encoding the computed unique value into the identified TOS or DSCP header field for each of the received plurality of network packets; and forward the plurality of network packets to a destination after processing each of the plurality of network packets through the identified value added service chain based on the encoded unique value.

14. The network traffic management system of claim 13, wherein the one or more processors are further configured to be capable of executing the programmed instructions stored in the memory to obtain requested application data and client data from each of the received plurality of network packets.

15. The network traffic management system of claim 13, wherein the one or more processors are further configured to be capable of executing the programmed instructions stored in the memory to determine when each of the received plurality of network packets are associated with an existing network connection.

16. The network traffic management system of claim 14, wherein the one or more processors are further configured to be capable of executing the programmed instructions stored in the memory to obtain the policy data and the subscription data associated with the application data and the client data when any of the received plurality of network packets are unassociated with any existing network connection.

17. The method as set forth in claim 1 further comprising:
encoding the computed unique value indicative of the identified value added service chain into a source port field of each of the received plurality of network packets; and processing each of the received plurality of network packets through the identified value added service chain based on the encoded unique value in the source port field.

18. The medium as set forth in claim 5 further comprising:
encoding the computed unique value indicative of the identified value added service chain into a source port field of each of the received plurality of network packets; and processing each of the received plurality of network packets through the identified value added service chain based on the encoded unique value in the source port field.

19. The apparatus as set forth in claim 9 wherein the one or more processors are further configured to be capable of executing the programmed instructions stored in the memory to:

encode the computed unique value indicative of the identified value added service chain into a source port field of each of the received plurality of network packets; and process each of the received plurality of network packets through the identified value added service chain based on the encoded unique value in the source port field.

20. The network traffic management system of claim 13, wherein the one or more processors are further configured to be capable of executing the programmed instructions stored in the memory to:

encode the computed unique value indicative of the identified value added service chain into a source port field of each of the received plurality of network packets; and process each of the received plurality of network packets through the identified value added service chain based on the encoded unique value in the source port field.

* * * * *